US006687933B2

(12) United States Patent
Habboub et al.

(10) Patent No.: US 6,687,933 B2
(45) Date of Patent: Feb. 10, 2004

(54) BODY SUPPORT SYSTEM WITH ENERGY DISSIPATION MEANS

(75) Inventors: Amin K. Habboub, Muscatine, IA (US); Marcus C. Koepke, Indianapolis, IN (US); Matthew J. Phillips, Muscatine, IA (US)

(73) Assignee: Hon Technology, Inc., Muscatine, IA (US)

(*) Notice: Subject to any disclaimer, the term of this patent is extended or adjusted under 35 U.S.C. 154(b) by 0 days.

(21) Appl. No.: 10/172,699

(22) Filed: Jun. 14, 2002

(65) Prior Publication Data

US 2003/0041379 A1 Mar. 6, 2003

Related U.S. Application Data

(63) Continuation-in-part of application No. 09/882,503, filed on Jun. 15, 2001, now Pat. No. 6,598,251.

(51) Int. Cl.[7] .............................................. A47C 27/18
(52) U.S. Cl. ......................... 5/654; 5/909; 297/452.42
(58) Field of Search ........................... 5/654, 653, 655.5, 5/736, 724, 909, 726, 652.1, 652.2, 490; 297/452.42, 452.46, 452.48

(56) References Cited

U.S. PATENT DOCUMENTS

| 847,238 A | 3/1907 | Carroll |
| 1,600,915 A | 9/1926 | Verka |
| 2,223,861 A | 12/1940 | Wagner |
| 2,826,244 A | 3/1958 | Hurley |
| 3,280,410 A | 10/1966 | Propst et al. |
| 3,289,748 A | 12/1966 | Jennings |
| 3,738,702 A | 6/1973 | Jacobs |
| 3,818,522 A | 6/1974 | Schuster |
| 4,026,299 A | 5/1977 | Sauder |
| 4,114,620 A | 9/1978 | Moore et al. |
| 4,149,541 A | 4/1979 | Gammons et al. |
| 4,379,352 A | 4/1983 | Hauslein et al. |
| 4,416,281 A | 11/1983 | Cooper et al. |
| 4,451,083 A | 5/1984 | Marchello |
| 4,577,907 A | 3/1986 | Talmon et al. |
| 4,673,216 A | * 6/1987 | Alfer ............................. 5/654 |
| 4,706,672 A | 11/1987 | Jones |
| 4,726,624 A | 2/1988 | Jay |
| 4,788,730 A | * 12/1988 | Bexton ......................... 5/909 |
| 4,844,072 A | 7/1989 | French et al. |
| 4,884,304 A | 12/1989 | Elkins |
| 4,930,173 A | 6/1990 | Woller |
| 4,962,761 A | 10/1990 | Golden |
| 4,965,898 A | 10/1990 | So |

(List continued on next page.)

FOREIGN PATENT DOCUMENTS

| DE | 29816349 | 2/2000 |
| EP | 1097953 | 5/2001 |
| EP | 1097954 | 5/2001 |

(List continued on next page.)

OTHER PUBLICATIONS

Published U.S. patent application Ser. No. 10/183,541; Publication No. US 2002/0174972 A1.
Published U.S. patent application Ser. No. 10/158,311; Publication No. US 2003/0030319 A1.

*Primary Examiner*—Alexander Grosz
(74) *Attorney, Agent, or Firm*—Ronald A. Sandler; Jones Day

(57) ABSTRACT

A body support system is provided having improved static and dynamic mechanical response characteristics and improved thermal regulation, and which can provide energy dissipation capabilities. The body support system can be of a modular construction to provide mechanical response characteristics suited to a particular user or group of users, or to a particular environment of use. The energy dissipation characteristics are provided by a flexible fluid compartment containing a volume of viscous fluid, such that at least a portion of the fluid moves within the compartment in response to a vertical force on the compartment.

29 Claims, 7 Drawing Sheets

U.S. PATENT DOCUMENTS

| | | |
|---|---|---|
| 4,966,145 A | 10/1990 | Kikumoto et al. |
| 5,002,336 A | 3/1991 | Feher |
| 5,058,291 A | 10/1991 | Hanson |
| 5,072,875 A | 12/1991 | Zacoi |
| 5,093,380 A | 3/1992 | Takeyasu et al. |
| 5,097,829 A | 3/1992 | Quisenberry |
| 5,106,161 A | 4/1992 | Meiller |
| 5,138,138 A | 8/1992 | Theilacker et al. |
| 5,147,685 A | 9/1992 | Hanson |
| 5,169,384 A | 12/1992 | Bosniak et al. |
| 5,174,285 A | 12/1992 | Fontenot |
| 5,176,424 A | 1/1993 | Tobita et al. |
| 5,183,039 A | 2/1993 | Sarian et al. |
| 5,189,747 A * | 3/1993 | Mundy et al. .................. 5/653 |
| 5,201,780 A | 4/1993 | Dinsmoor, III et al. |
| 5,226,188 A | 7/1993 | Liou |
| 5,255,404 A | 10/1993 | Dinsmoor, III et al. |
| 5,269,369 A | 12/1993 | Faghri |
| 5,336,708 A | 8/1994 | Chen |
| 5,344,436 A | 9/1994 | Fontenot et al. |
| 5,395,162 A | 3/1995 | Jay et al. |
| 5,405,179 A | 4/1995 | Jih |
| 5,433,083 A | 7/1995 | Kuramarohit |
| 5,448,788 A | 9/1995 | Wu |
| 5,456,701 A | 10/1995 | Stout |
| 5,467,489 A | 11/1995 | Cchen |
| 5,468,139 A | 11/1995 | Stender |
| 5,486,206 A | 1/1996 | Avery |
| 5,508,334 A | 4/1996 | Chen |
| 5,568,660 A | 10/1996 | Raburn et al. |
| D375,863 S | 11/1996 | Bigolin |
| 5,588,165 A | 12/1996 | Fromme |
| 5,590,428 A | 1/1997 | Roter |
| 5,597,200 A | 1/1997 | Gregory et al. |
| 5,617,595 A | 4/1997 | Landi et al. |
| 5,625,964 A | 5/1997 | Lyden et al. |
| 5,633,286 A | 5/1997 | Chen |
| 5,634,224 A * | 6/1997 | Gates ........................... 5/654 |
| 5,636,395 A | 6/1997 | Serda |
| 5,645,314 A | 7/1997 | Liou |
| 5,669,094 A | 9/1997 | Swanson |
| 5,686,501 A | 11/1997 | Triolo |
| 5,749,111 A | 5/1998 | Pearce |
| 5,788,332 A | 8/1998 | Hettinga |
| 5,815,865 A | 10/1998 | Washburn et al. |
| 5,832,852 A | 11/1998 | Tornero et al. |
| 5,845,352 A | 12/1998 | Matsler et al. |
| 5,907,911 A | 6/1999 | Huang |
| 5,918,381 A | 7/1999 | Landry |
| 5,933,891 A * | 8/1999 | Nachod, III ................... 5/654 |
| 5,966,763 A | 10/1999 | Thomas et al. |
| 5,994,450 A | 11/1999 | Pearce |
| 6,018,832 A | 2/2000 | Graebe |
| 6,048,024 A | 4/2000 | Wallman |
| 6,059,018 A | 5/2000 | Yoshinori et al. |
| 6,079,782 A | 6/2000 | Berg et al. |
| 6,092,249 A | 7/2000 | Kamen et al. |
| 6,109,688 A | 8/2000 | Wurz et al. |
| 6,120,630 A | 9/2000 | Lorbiecki |
| 6,170,173 B1 | 1/2001 | Caston |
| 6,179,706 B1 | 1/2001 | Yoshinori et al. |
| 6,191,216 B1 | 2/2001 | Ganster et al. |
| 6,199,234 B1 | 3/2001 | Srour et al. |
| 6,202,239 B1 | 3/2001 | Ward et al. |
| 6,207,738 B1 | 3/2001 | Zuckerman et al. |
| 6,212,719 B1 * | 4/2001 | Thomas et al. ................ 5/654 |
| 6,224,623 B1 | 5/2001 | Augustine et al. |
| 6,226,819 B1 | 5/2001 | Ogama et al. |
| 6,241,320 B1 | 6/2001 | Chew et al. |
| 6,250,719 B1 | 6/2001 | Gebhardt |
| 6,257,237 B1 | 7/2001 | Suzuki |

FOREIGN PATENT DOCUMENTS

| | | |
|---|---|---|
| EP | 1103371 | 5/2001 |
| WO | 99/29152 | 6/1999 |
| WO | 01/29120 | 4/2001 |
| WO | 01/41523 | 6/2001 |

* cited by examiner

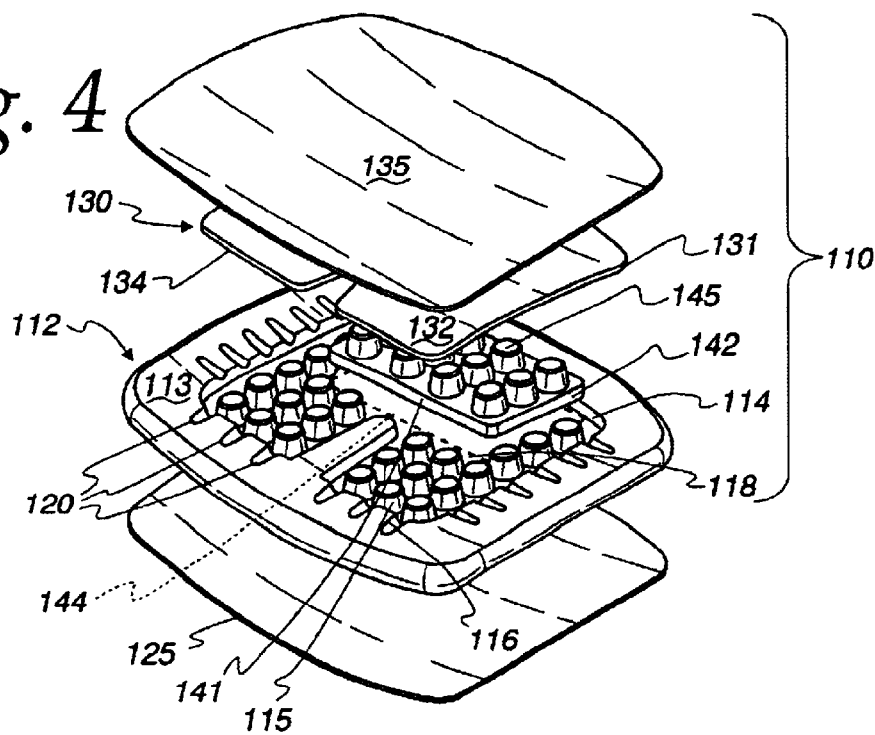
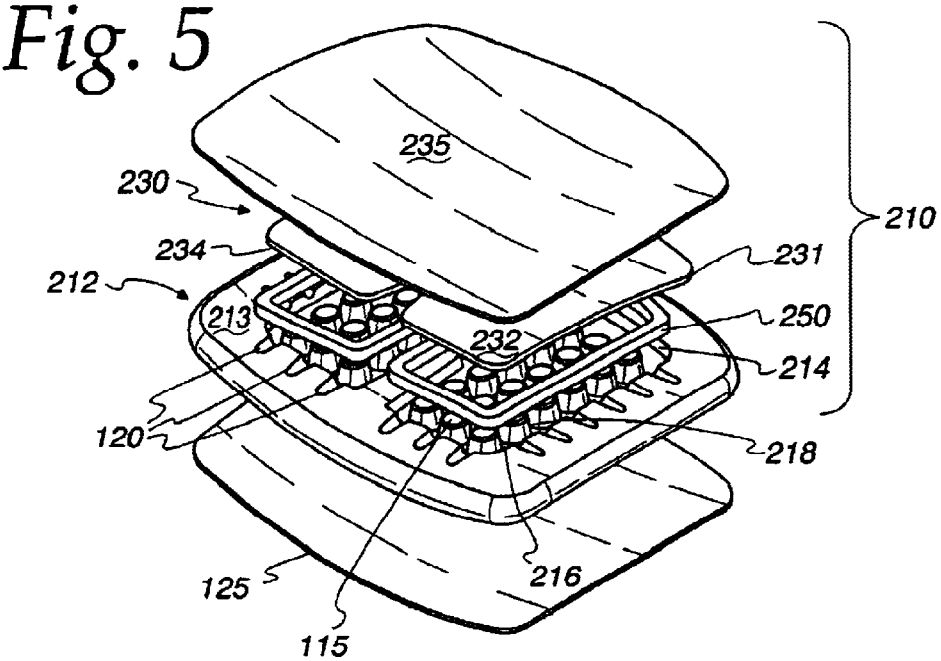

BODY SUPPORT SYSTEM WITH ENERGY DISSIPATION MEANS

This is a continuation-in-part application of U.S. Ser. No. 09/882,503, filed Jun. 15, 2001 now U.S. Pat. No. 6,598,251.

BACKGROUND OF THE INVENTION

This invention relates to a body support system such as may be used for a seat cushion. More particularly, this invention relates to a body support system such as may be used for a seat cushion and having improved mechanical response characteristics and improved thermal interaction with a user.

The comfort provided to a user by a body support system such as a seat cushion will depend on a variety of factors. One such factor is the mechanical response of the body support system to the compressive and shear forces applied by a user interfacing the body support system, e.g., a user seated on a cushion. Mechanical response includes static and dynamic responses. Another such factor is the ability of the body support system to provide thermal regulation with a user resulting from the inherent heat exchange process/mechanisms in the body support system. If the body support system is to be used in conjunction with a moving vehicle/vessel/device including a wheelchair, a farm implement such as a tractor or riding mower, or as a seating element for public transportation, then the ability of the body support system to provide adequate dynamic response characteristics to applied dynamic excitations and reduce Whole Body Vibration (WBV) by means of reducing transmission of harmful frequency components to the user, is another factor.

Conventional contemporary office seats are usually made of either upholstered padding or synthetic mesh in a frame assembly. Each of these types of seats has its own characteristic thermal properties. Padded upholstery (e.g., polyurethane foam) seating provides limited heat exchange with the user, which however mainly occurs through conduction and sweat evaporation processes. As a result, upholstered padding is better suited for lower workspace temperatures on the order of 16–25° C. (61–77° F.) and shorter sitting times before heat starts to build up and un-evaporated sweat starts to develop at the user-body support system interface On the other hand, mesh seating provides excessive heat exchange between the surrounding environment and the user mainly through radiation and convection heat exchange processes. In the case of mesh seating, these heat exchange processes do not depend on intrinsic properties of the body support system, but also depend on extrinsic factors such as surrounding environmental parameters including temperature and air speed, and on factors such as workspace configuration, surface orientations, and temperatures and thermal reflectivity of adjacent surfaces such as floor and walls. As a result, mesh chairs may be better suited for higher workspace temperatures of 25–35° C. (77–95° F. and longer sitting times. Neither of these prior art seating designs provides for thermal regulation in a wide variety of office temperature environments and workspace configurations.

Another disadvantage of mesh seat upholstery is its tendency to "creep," that is, to deform viscously or irrecoverably, with disproportional stress-strain rate characteristics especially in the territrial stress-strain regime, which might be reached (for many mesh materials)when the user's weight is large, therefore resulting in non-uniform mechanical response to a wide range of users. Creep is a significant problem when the seat mesh is subjected to heavy sustained user's weight over prolonged time. Control of creep usually requires cross directional mesh reinforcement with fibers that have very limited creep characteristics. Without proper control, however, creep can cause excessive deformation in the seat mesh, eventually leading to loss of contact at the user-seat interface, and a severe reduction in the total load carrying capacity of the body support system. This results in excessive cognitive (conscious and subconscious) weight shifting towards the front under-thighs and to the feet- and armrests, factors that may be directly related to discomfort and unfavorable ergonomic conditions.

Thermal properties are major ergonomic features that should be considered in the design of an office chair. The human body always works to retain its core temperature near 37° C. (98.6° F.), by means such as postural adjustments, varying skin temperatures such as by perspiration, regulation of cardiovascular and pulmonary activity such as pulse and breath rates to affect blood flow and vessel sizes especially in skin areas close to a heat-exchanging interface such as that with a seat cushion. A chair that prompts sweating after a relatively short period of sitting and which requires the human body to engage in such thermal self-regulatory processes will be uncomfortable and may affect work efficiency/productivity. For example, with conventional upholstered padding, heat can quickly build up at the user/seat interface causing the user to limit metabolic rates such as muscular activity to reduce heat generation, therefore severely affecting work efficiency. The user may also begin sweating to initially expedite the thermal transfer across the user skin, and to attempt to prompt the sweat evaporation cooling process. When the user/seat interface inhibits sweat evaporation due to low cushion vapor permeability under even small pressures, heat is not dissipated at the interface leading to even greater discomfort for the user. On the other hand, mesh chairs have high vapor permeability and heat dissipation and do not allow for any heat build up at the seat user interface. With colder workspace environments, and closer, oppositely oriented, highly reflective, and cold office space surfaces (floors/walls, etc.), and with high (transient or steady) airspeeds, the user is set to become responsible to generate heat that seeks thermal equilibrium with the whole environment; a condition that prompts discomfort. This might allow for excessive user heat loss or gain. It is therefore postulated that a limited heat build up at the interface would be favorable to reverse the thermal gradient across the interface. Thus, with open mesh seats the thermal comfort of the user becomes significantly dependent on the ambient temperature of the work environment and configuration.

Further, conventional seating designs do not provide for variations in the size and comfort levels of different users. Different individuals will have different load characteristics and different thermal generation rates therefore producing different comfort levels (including psychometrics).

It is thus one object of the invention to provide a body support system such as a seat cushion having improved thermal regulation properties.

It is yet another object of the invention to provide a body support system such as a seat cushion having improved mechanical response properties including wider low intensity pressure distribution and better dynamic response characteristics.

It is also another object of the invention to provide a an energy dissipation system as a component of the body of the support system to provide even greater comfort to a user.

It is still another object of the invention to provide a body support system such as a seat cushion in which the thermal regulation properties and/or the mechanical characteristics can be varied to the needs or preferences of a particular user or group of users by varying amongst the many design parameters in the system.

SUMMARY OF THE INVENTION

A body support system is provided having improved mechanical (static and dynamic) support characteristics and improved thermal interaction with a user. The improved static support is provided by means for distributing the weight of a user in response to applied compressive and shear forces at the user-support system interface. The means for distributing the weight of the user comprises a plurality of vertical columns disposed substantially centrally in said body support system. Without connecting the columns by means of an elastomeric layer, the columns are capable of deflecting substantially independently of one another in response to the compressive forces applied by a user. The improved thermal interaction is provided by structures that provide enhanced airflow through and about said body support system, thereby providing for convective thermal regulation, and dry and evaporative heat exchange. An elastomeric member disposed above said columns also serves to facilitate heat exchange with a user, and cooperates with the columns in the distribution of the user's weight for improved static and dynamic support. The elastomeric layer acts to level out column deflections, therefore limiting the reaction acting back on the user by an individual column and invoking a more collective response, therefore reducing interfacial pressure peaks and gradients. The improved dynamic response is achieved by dampening the peak amplitudes of the response and filtering out harmful frequency components of the dynamic loading. Proportioning the mass and stiffness substantially determines the desirable dynamic response properties of the body support system.

The body support system comprises a foam body. In one embodiment, the vertical columns can be configured as upwardly extending risers, formed integrally with said foam body. In an alternative embodiment, the columns can extend downwardly from the elastomeric member. The columns can be formed of a material having density and mechanical response characteristics either the same as or different from the density and mechanical response characteristics of the foam body. This feature permits the inventive body support system to be customized to the needs of different users.

The spaces between the vertical columns define a reservoir for a fluid such as air within the interior of the body support system. The body support system further comprises means for displacing and/or directing the flow of fluid, typically air, from the fluid (air)reservoir to the periphery of the body support system, and then toward the upper surface thereof, for heat exchange processes with the user, thereby increasing the comfort of the user when using the body support system for long periods of time. The means for directing the flow of fluid from the fluid reservoir to the periphery can comprise a plurality of channels formed within the foam body and extending from the air reservoir to the foam body periphery. When compressive forces are applied by a user, fluid (air) within the reservoir will be displaced and directed through the channels toward the periphery and upwards. Advantageously, airflow through the body support system is achieved without the need for active airflow circulation devices such as fans, blowers, valves, or pumping devices. Air deflecting means disposed about the periphery of the foam body function to deflect the air received at the periphery from the reservoir to a region above the foam body for heat exchange with the user. This thermal regulation function is further enhanced by the aforementioned elastomeric member, which functions as a large capacity heat sink to remove heat from a user generating excessive heat The body support system of the instant invention can further comprise an air-permeable viscoelastic layer disposed above the elastomeric member and the foam body. The viscoelastic layer can reduce the transmission of both compressive and shear forces to the elastomeric member. The air-permeable viscoelastic layer can also facilitate the flow of displaced air at the periphery of the cushion to enhance thermal regulation. The airflow achieved with the body support system of the instant invention also contributes to mechanical function of the body support system by providing recoverable dissipation of applied shear and compressive forces The body support system of the instant invention can further comprise energy modulation means for converting the vertical component of the applied loading energy, such as a user's weight, to non-vertical, such as horizontal, dissipative components, which would effectively decrease the real vertical reaction experienced by a user, therefore enhancing comfort. In one embodiment, the energy modulation means can comprise a member having a top layer and a bottom layer, each made of a flexible fluid-tight membrane, the top and bottom layers being joined at their respective peripheries to form a bladder, or flexible fluid compartment, having an interior volume, and one or more walls in said interior volume, said walls extending between the inner surface of said top and bottom layers to define a plurality of interconnected flexible fluid chambers within said interior volume, said chambers being interconnected via baffles, spaces, or minute orifices between and in said walls. Said interior volume contains a viscous fluid that can flow in and among the various interconnected chambers. When a force such as the weight of a user is applied to the top of the energy modulation means, at least some of the viscous fluid in those chambers directly beneath the force is further pressurized and squeezed out from chambers experiencing higher pressurization due to vertical force application to other chambers experiencing less of such force. The horizontal movement of the viscous fluid between the interconnected chambers dissipates the energy applied by the user so that the user experiences less resistance and greater comfort. The energy dissipation means presents many parameters that can be varied to meet the needs of a particular user or a particular type of use. These parameters include, for example, the materials used in the top and bottom layers and interior walls, the dimensions of the layers and walls, the dimensions of the spaces or orifices interconnecting said chambers, and the volume and viscosity of the viscous fluid. In an alternate embodiment, the flexible fluid compartments may be all fully connected to form a full one fluid compartment, filled with viscous fluid that may optionally be pressurized. In another embodiment, such full compartment may be depressurized and evacuated from fluid, so that it can fill with air or fluid pouring into it from an outside source by means of an inlet flexible tube, equipped with a one-way valve, therefore, providing means to store such externally pouring fluid, and means to later dispose of it, by means of an outlet flexible tube, equipped with a one-way valve, by either using differential static pressure or by using of micro-pumps attached to such pressurized or un-pressurized fluid containment system. In at least one of the embodiments above, the flexible fluid compartment may be inflated with air of fluid from an external source in order to provide a back reaction on the underside of the said elastomeric layer. Such back reaction would transmit back to the user through the optional overlay, thereby providing means to stiffen the body support system when needed The body support system of the instant invention can be used in a wide variety of seating applications. The body support system can be configured as a seat cushion such as for use in office seating, in which case the seat cushion can be mounted onto a chair frame including a preformed seat pan. The seat pan acts as a high-stiffness or as a rigid support for the cushion. The body support system can also be used in rehabilitative seating and other body support applications, such as in wheelchairs, hospital beds, sports cushions, such as in stadiums, and the like, where improved responsiveness to compressive and shear forces can help in the prevention of pressure concentrations which might lead to decubitus ulcers. It can also be used in seating or bedding for personal assistance purposes such as the case with users confined to their seats or beds for prolonged periods of time, and requiring readily available fluid containment and management system fully embedded within the thinness of the body support system. The inventive body support system can also be used in dynamic situations such as motor vehicles, particularly vehicles driven for long periods of time such as trucks, and even more particularly vehicles driven for long periods of time over uneven surfaces, such as snowplows and farm implements, which vehicles are subject to motion-induced vibration and in which the vehicle driver can benefit from the damping of such motion-induced vibration as can be provided by the inventive body support system disclosed herein.

DESCRIPTION OF THE FIGURES

FIG. 4 is an exploded view of a second embodiment of a seat cushion made in accordance with the instant invention.

FIG. 5 is an exploded view of a third embodiment of a seat cushion made in accordance with the instant invention.

DETAILED DESCRIPTION OF THE INVENTION

The figures herein illustrate various embodiments of the invention wherein the body support system is in the form of a seat cushion such as for use with an office chair. It will be understood that these embodiments are presented herein for illustrative purposes only, and that the inventive body support member can be used in other embodiments and for other purposes, as discussed below.

Figure 1:
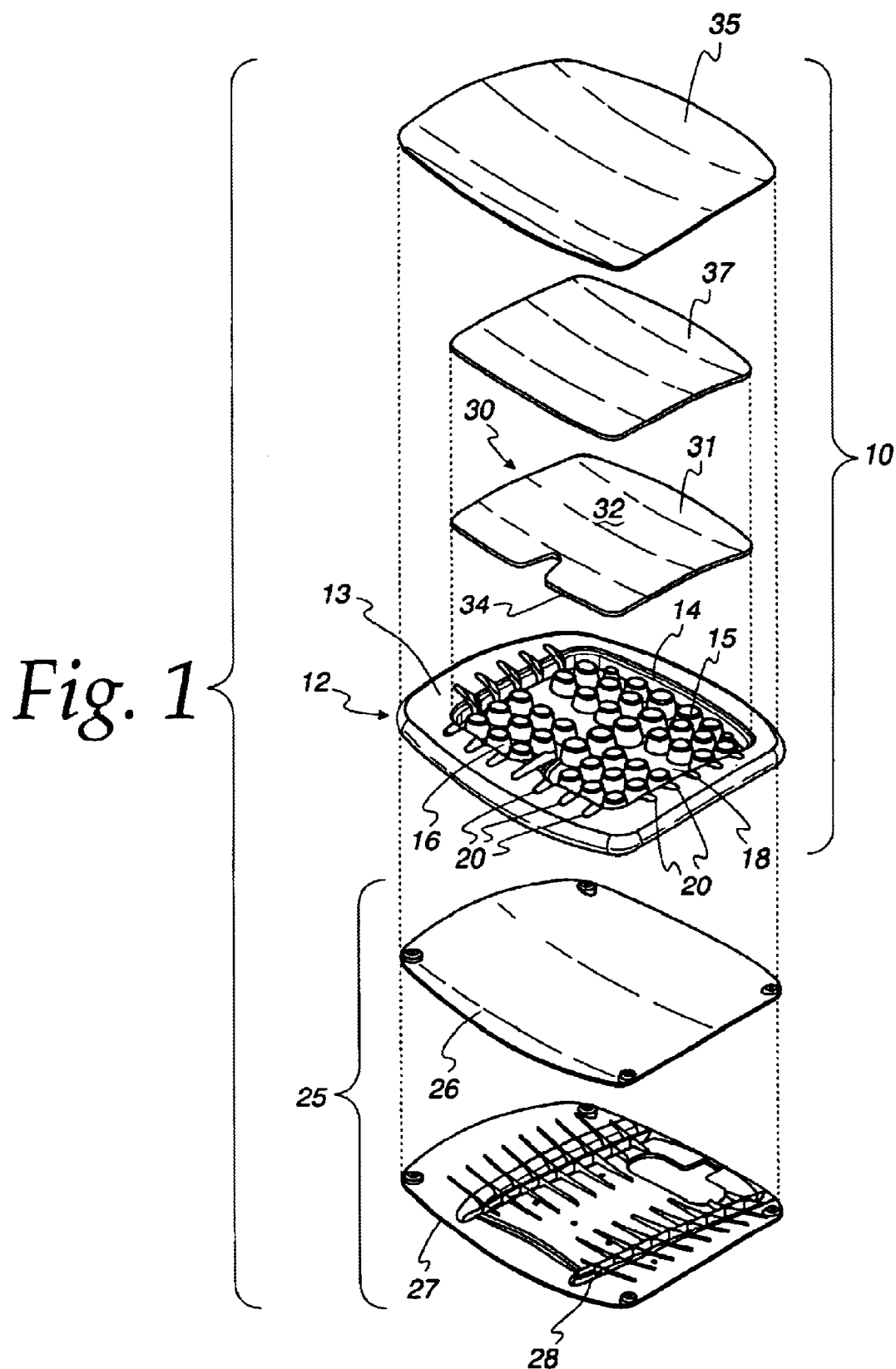
FIG. 1 is an exploded view of an embodiment of a seat cushion made in accordance with the instant invention and a seat pan with which it can be used.

FIG. 1 is an exploded view of a first embodiment of a seat cushion body support member 10 of the instant invention. Seat cushion 10 comprises foam body 12, illustrated in FIGS. 1–3. Foam body 12 can be formed of materials typically used in such seat cushions, such as open-celled or closed-celled polyurethane foam. Foam body 12 has an upper surface 13 and a plurality of vertical columns 15 disposed substantially centrally in said foam body 12. In the illustrated embodiment, the columns 15 extend upwardly such that the top surface of said columns 15 define a planar curved surface that is substantially parallel to upper surface 13. In the embodiment illustrated in FIGS. 1–3, the columns 15 are formed integrally with foam body 12. The foam material of which foam body 12 and columns 15 are made will be resiliently deformable to some extent. The columns 15 are structured such that, in the absence of other structural elements of the body support member 10, each column 15 is capable of deflecting substantially independently of the other columns 15 in response to compressive forces applied by a user.

Vertical columns 15 are structured so as to define a plurality of air spaces 16 therebetween, which together define a plenum or reservoir 18 for a fluid such as air. A plurality of channels 20 disposed within foam body 12 extend from air reservoir 18 toward the periphery of foam body 12. In the illustrated preferred embodiment of a seat cushion, the channels 20 are directed to the front and lateral sides of the foam body 12.

Design parameters of vertical columns 15 include their number, planar spacing, depth, aspect ratios, and material density and stiffness. Depending on their size and shape, the number of vertical columns can be in the range of about 5–180 columns, more preferably in the range of about 30–90 columns, and even more preferably about 40–80 columns. The columns can have a diameter at their lower end in the range of about 0.5–4.0 inches, more preferably in the range of about 0.75–3.0 inches, and most preferably in the range of about 1.0–2.0 inches. The columns can have a diameter at their upper end in the range of about 0.5–4.0 inches, more preferably in the range of about 0.75–3.0 inches, and most preferably in the range of about 0.9–2.0 inches. The height of the columns can range up to about 4 inches, more preferably will be in the range of about 0.5–3.0 inches, and most preferably will be in the range of about 0.5–1.5 inches. The columns 15 in a seat cushion 10 can be of different sizes and shapes.

The number of air channels 20 will depend upon their size. For example, in the illustrated embodiment, the channels 20 directed toward the front edge of the chair are of different sizes with one large channel in the center and three smaller channels on either side of the large channel. Similarly, the channels 20 directed toward the sides of the chair can be of predetermined size and n. The total volume capacity of channels 20 will be a function of the volume capacity of air reservoir 18.

The seat cushion 10 further comprises an elastomeric layer 30 that overlays the upwardly extending risers 15. In the illustrated embodiment, the periphery 31 of elastomeric layer 30 is seated within fitting edge 14 at the upper surface 13 of foam body 12. Elastomeric layer 30 comprises a top surface 32 and a bottom surface 34. Bottom surface 34 of elastomeric layer 30 defines the top surface of air reservoir 18. Elastomeric layer 30 comprises a material having significant resilience and flow properties. Suitable materials for elastomeric layer 30 include, for example, a gelatinous sheet and a polymeric membrane, or other gelatinous materials with variable viscoelastic properties. One suitable material includes a gel sold under the trademark LEVAGEL® by Royal Medica of Italy. Information about this material is available at www.royalmedica.it. Elastomeric layer 30 and upwardly extending risers are each characterized by both an elastic stiffness value and a dissipative stiffness value. The elastomeric layer 30 may be reinforced with textile fabric sheets placed within the thickness of such elastomeric layer or adhered onto it from either or both sides. Such reinforcement might include pre-tensioning fabric fibers or post-tensioning those with the gelatinous material. In a preferred embodiment of the invention, the ratio of elastic stiffness to dissipative stiffness of the vertical columns 15 is greater than the ratio of elastic stiffness to dissipative stiffness of the elastomeric layer 30.

Depending on the material selected, the application of the body support system, and the properties of the body support system desired, elastomeric layer 30 can have a thickness in the range of about 0.1–1.5 inches, more preferably in the range of about 0.1–0.5 inches, and most preferably in the range of about 0.2–0.4 inches. As illustrated in FIG. 1, the area of elastomeric layer 30 can be less than the area of top surface 13. The relative area of elastomeric layer 30 to top surface 13 can be in the range of about 20–95%, more preferably in the range of about 25–60%, and most preferably in the range of about 30–55%. In one embodiment, elastomeric layer 30 is about 0.25 inches thick, and has an area of 210 sq. in., relative to a total area of top surface 13 of 392 sq. in.

In use, the foam body 12 of seat cushion 10 is supported by a stiff seat pan 25 fixed on a seating system (not shown). In the illustrated embodiment, seat pan 25 comprises an inner pan 26 bolted to pan support 27. Pan support 27 can be made of glass-filled nylon, for example, and preferably includes a plurality of support ribs 28. When a user is seated on a seat cushion of the instant invention, the user's weight is transmitted as vertical compressive forces and transverse shear forces to the user/seat cushion interface. These forces are transmitted through elastomeric layer 30 to vertical columns 15. Elastomeric layer 30 and vertical columns 15 function cooperatively with one another to achieve a desired self-limiting mechanical response. As a result of the ratios of elastic stiffness to dissipative stiffness of the columns 15 and elastomeric layer 30, each column 15 responds substantially in the manner of an elastic spring with weak dissipation, analogous to various engineering models of springs and dashpots. Highly localized compressive forces at the seat/user interface would result in undesirable pressure peaks, resulting in greater deformation of the columns 15 in that particular location, i.e., each column is expected to deform in direct proportion to the applied forces to that column. The elastomeric layer 30 mitigates these ergonomically undesirable effects by deforming in response to the applied forces, partially dissipating the applied forces and causing elastic transfer of excess applied force to neighboring or remote columns 15. The applied forces are distributed to neighboring or remote columns 15 to obtain a more even pressure distribution. Thus, elastomeric layer 30 creates interdependence of the column deflections by transmitting stresses resulting from differential column deflections, by elastic and dissipative means, thereby limiting individual column deflections, and the corresponding column reaction on the user's body in that pressure-peak locality, in a predetermined manner. The vertical force due to a user-imposed loading would be reacted by vertical column reactions and by vertical projections of the elastic and dissipative tension in the elastomeric layer, thereby reducing the back reaction (pressure) intensity of the real vertical reaction experienced by the user. In accordance with the invention, the materials and geometric features of the elastomeric layer 30 and columns 15 may be selected to produce the level of applied force redistribution desired for a particular user or a particular type of seating application.

The redistribution of applied forces can be further enhanced by air-permeable layer 35, disposed above elastomeric layer 30. Air-permeable layer 35 may comprise an open-cell or non-woven viscoelastic material having specified thickness and viscoelastic properties, which air-permeable layer 35 can function to further dissipate applied forces before such forces reach elastomeric layer 30. Optionally, an intermediate foam layer 37 can be placed between air-permeable layer 35 and elastomeric layer 30. A cover fabric, not shown, can overlie the entire seating structure. The layers 12, 30, 37, 35, and the cover fabric can be pre-bonded to one another such as with adhesives. Alternatively, the layers can simply be stacked on top of each other, in which case there should be a sufficient amount of friction between the layers to prevent slippage of the layers with respect to one another in response to shear forces applied during use.

The structure of the instant invention will transmit shear forces emanating at the user/seat interface across the interfaces between each of the layers until elastomeric layer 30. Elastomeric layer 30 will deform viscously in response to applied shear forces, thereby counteracting the shear component of the user's weight and/or applied loads by dissipative means, such that the user's skin will not experience the real elastic shear component. As a result, the user's tissues will experience substantially only compressive stresses in the normal direction. This reduction in shear stress can reduce tissue straining and distortion, and therefore could reduce the potential for the development of pressure ulcers, and reduce undesirable interference with blood vessel activity in the vicinity of these tissues.

When the user leaves the seat cushion of the instant invention, the resiliency of the foam body 12, vertical columns 15 and the elastomeric layer 30 allows full recovery of both shear and compression deformational mechanisms of the cushion. The passive air pump depressurizes, allowing outside air to pass through the outside cover, the air permeable layer, and optional intermediate foam layer to enter the air reservoir and channels, and open cells in the foam body 12 if open-celled foam is used. The elastomeric layer 30 will also return to its original shape prior to the application of compression and shear forces by a user.

The body support system of the instant invention provides both dynamic and static support. User discomfort in dynamic seating situations arises when vibrations are transmitted through a seating system to the user, such as in vehicle or public transportation seating systems. The multi-layer structure of the inventive body support system provides enhanced dynamic support by filtering out harmful higher frequency components in the compressive and shear vibration modes. Each of the body support system elements, namely, the foam body, the vertical columns, the elastomeric layer, and the air permeable layer, can contribute to the vibration filtering process. The materials for these elements, and the size and shape of these elements, can be selected to provide dynamic support characteristics for a particular environment in which the body support system will be used. Static support will be a function of the stiffness of the components, and particularly the stiffness of the vertical columns.

The inventive body support system also provides improved thermal interaction with a user. This is achieved through several means. The inventive body support system promotes thermal exchange between the user as a heat source and the body support system as a heat conduit and heat sink. This heat exchange is achieved partially through convection, facilitated by air exchange. In the embodiment in which the body support system is a seat cushion, when the seat cushion is not in use, air reservoir 18 and air channels 20 are filled with air, as are the cells of foam body 12. When a user occupies the seat and applies compressive and shear forces to seat cushion 10, air is forced from air reservoir 18 through air channels 20 from which it is reflected back to the region between elastomeric layer 30 and air-permeable layer 35. Some air may also permeate directly from air channels 20 through air-permeable layer 35 or to cover fabric. Air-permeable layer 35 serves to diffuse the air toward the user to facilitate heat exchange and promote user comfort. Air permeable layer 35 also allows air/vapor permeation from the user to the seat cushion, where air/vapor and heat can pass through air-permeable layer 35 to elastomeric layer 30, which then acts as a heat sink. This airflow at the user/seat interface also allows for evaporation which enhances the cooling effects and further promotes user comfort.

To facilitate heat exchange, the optimal air-permeable layer 35 will have pre-selected fiber directionality and anisotropic air-permeability, depending on the particular application of seat cushion 10. In addition, air-permeable layer 35 can be treated with phase changing materials to further regulate heat exchange processes at the user/seat interface. Such phase change materials, generally in the form of tiny capsules, will be such size and packed in such a way that the microporosity of air-permeable layer 35 will not be affected. Suitable phase change materials include those commercially available from Outlast Technologies, Inc. of Boulder, Colo., and those described in U.S. Pat. No. 6,207,738 assigned to Outlast Technologies, Inc. Air-permeable layer 35 also may be formed from multiple layers of material.

Generally, in each of the embodiments disclosed herein, thermal regulation can be enhanced by 1) the cellular construction of the foam body; 2) the airflow circulation generated by the structures of the components of the body support system; 3) the large heat storage capacity of the elastomeric layer; 4) the thermal conductive properties of the materials selected; 5) the use of phase-change materials; and 6) the microporosity and air-permeable qualities of the cover fabric, and all the layers above the elastomeric layer.

The body support system of the instant invention thus allows convective heat transfer to occur along with, or in lieu of, conductive, evaporative, and/or radiative heat transfer processes such as those occurring with prior art devices. The favorable thermal properties are further achieved by pressurized air circulation mechanisms as a result of deformation of vertical columns 15. Advantageously, this air circulation may be achieved without airflow valves or fans, and without externally powered air pumps.

FIG. 4 illustrates an alternative embodiment of a seat cushion of the instant invention. Seat cushion 110 comprises foam body 112. Foam body 112 can be formed of materials typically used in such seat cushions, such as open-celled or closed-celled polyurethane foam. Foam body 112 has an upper surface 113 and a plurality of vertical columns 115 disposed substantially centrally in said foam body 112 such that the top surface of said columns 115 define a curved surface substantially parallel to that of upper surface 113. In the embodiment illustrated in FIG. 4, the columns 115 are formed integrally with foam body 112. The foam material of which foam body 112 is made will be resiliently deformable to some extent. The columns 115 are structured such that each column 115 is capable of deflecting substantially independently of the other columns 115 in response to compressive forces applied by a user.

Vertical columns 115 are structured so as to define a plurality of air spaces 116 therebetween, which together define a plenum or air reservoir 118. A plurality of channels 120 are disposed within foam body 112, and extend from air reservoir 118 toward the periphery of foam body 112.

The seat cushion 110 further comprises an elastomeric layer 130 that overlays the vertical columns 115. In the illustrated embodiment, the periphery 131 of elastomeric layer 130 is seated within fitting edge 114 at the upper surface 113 of foam body 112. Elastomeric layer 130 comprises a top surface 132 and a bottom surface 134. Bottom surface 134 of elastomeric layer 130 defines the top surface of air reservoir 118. Elastomeric layer 130 comprises a material having significant resilience and flow properties. Suitable materials for elastomeric layer 130 include, for example, a gelatinous sheet and a polymeric membrane, or other gelatinous materials with variable viscoelastic properties. Elastomeric layer 130 and vertical columns 115 are each mechanically characterized by both an elastic stiffness value and a dissipative stiffness value. In a preferred embodiment of the invention, the ratio of elastic stiffness to dissipative stiffness of the columns 115 is greater than the ratio of elastic stiffness to dissipative stiffness of the elastomeric layer 130. Elastomeric layer 130 will function in a manner analogous to that of elastomeric layer 30 in the embodiment of FIGS. 1–3.

Figure 2:
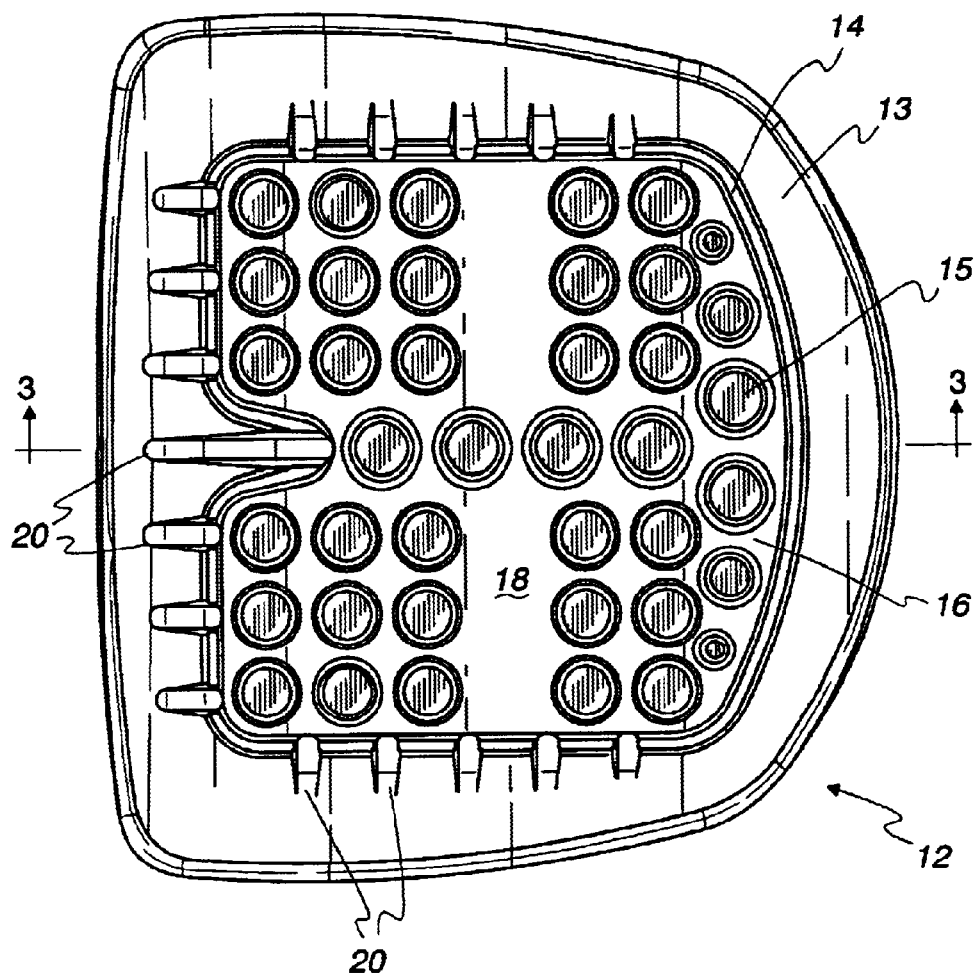
FIG. 2 is a top plan view of the foam body used in the embodiment of the seat cushion of FIG. 1.
Figure 3:
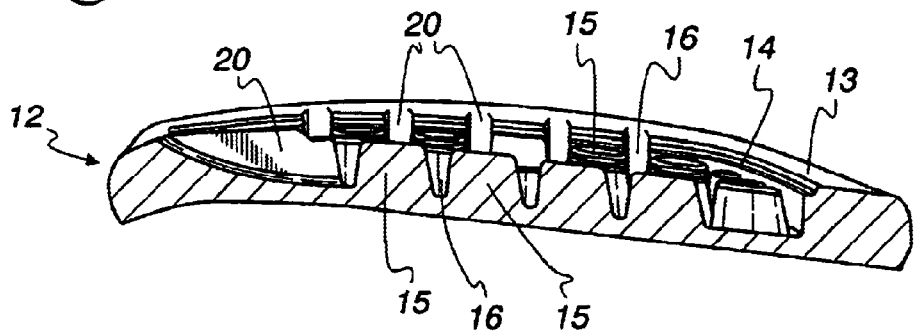
FIG. 3 is a cross-section view through line 3—3 of the foam body illustrated in FIG. 2.

The embodiment of FIG. 4 further comprises seat pan 125 and air-permeable layer 135, the structures and functions of which are analogous to those of seat pan 25 and air-permeable layer 35 in the embodiment illustrated in FIGS. 1–3.

The embodiment of FIG. 4 is characterized by modular insert 142 having vertical columns 145. Modular insert 142 has a perimeter 141 that will be sized and shaped to fit within the foam body 112. Modular insert 142 can be made of the same material as foam body 112, or modular insert 142 can be made of a material wherein the ratio of elastic stiffness to dissipative stiffness is greater than or less than that of the material of which foam body 112 is made. Further, the size and shape of columns 145 can be the same as or different from the size and shape of columns 115. The choice of materials to be used in the manufacture of modular insert 142, and the design of the size and shape of columns 145, permit the seating designer to select from a variety of mechanical and thermal properties, achieved by varying the modular construction, for the seat cushion 110 of the instant invention.

FIG. 5 illustrates yet another embodiment of a seat cushion made in accordance with the instant invention. Seat cushion 210 comprises foam body 212. Foam body 212 can be formed of materials typically used in such seat cushions, such as open-celled or closed-celled polyurethane foam. Foam body 212 has an upper surface 213 and a plurality of vertical columns 215 disposed substantially centrally in said foam body 212 such that the top surface of said columns 215 define a curved surface substantially parallel to upper surface 213. In the embodiment illustrated in FIG. 5, the columns 215 are formed integrally with foam body 212. The foam material of which foam body 212 is made will be resiliently deformable to some extent. The columns 215 are structured such that each column 215 is capable of deflecting substantially independently of the other columns 215 in response to compressive forces applied by a user on a contributory area of the user-seat interface that exists above the locality of that column/riser.

Vertical columns 215 are structured so as to define a plurality of air spaces 216 therebetween, which together define a plenum or air reservoir 218. A plurality of channels 220 disposed within foam body 212 extend from air reservoir 218 toward the periphery of foam body 212.

The seat cushion 210 further comprises an elastomeric layer 230 that overlays the vertical columns 215. Elastomeric layer 230 comprises a top surface 232 and a bottom surface 234. Bottom surface 234 of elastomeric layer 230 defines the top surface of air reservoir 218. Elastomeric layer 230 comprises a material having significant resilience and flow properties. Suitable material for elastomeric layer 230 include, for example, a gelatinous sheet and a polymeric membrane, or other gelatinous materials with variable viscoelastic properties. Elastomeric layer 230 and upwardly extending risers are each characterized by both an elastic stiffness value and a dissipative stiffness value. In a preferred embodiment of the invention, the ratio of elastic stiffness to dissipative stiffness of the columns 215 is greater than the ratio of elastic stiffness to dissipative stiffness of the elastomeric layer 230.

The embodiment of FIG. 5 further includes periphery edge component 250 designed to fit within fitting edge 214 of foam body 212, which edge surrounds the region of foam body 212 where vertical columns 215 are formed. In this embodiment, elastomeric layer 230 is also sized and shaped to fit within periphery edge component 250. Periphery edge component 250 thus serves to securely locate elastomeric layer 230 directly over vertical columns 215, thereby assuring that compressive and shear forces exerted by a user through elastomeric layer 230 will be transmitted to upwardly extending risers 215. In addition, periphery edge component 250 helps to define air reservoir 218, and can function as an airflow diffuser. Periphery edge component 250 can be made of materials such as open-cell polyurethane or non-woven synthetic material. Periphery edge component 250 can also be used in those embodiments of the invention that employ modular insert 142 illustrated in FIG. 4.

Figure 6:
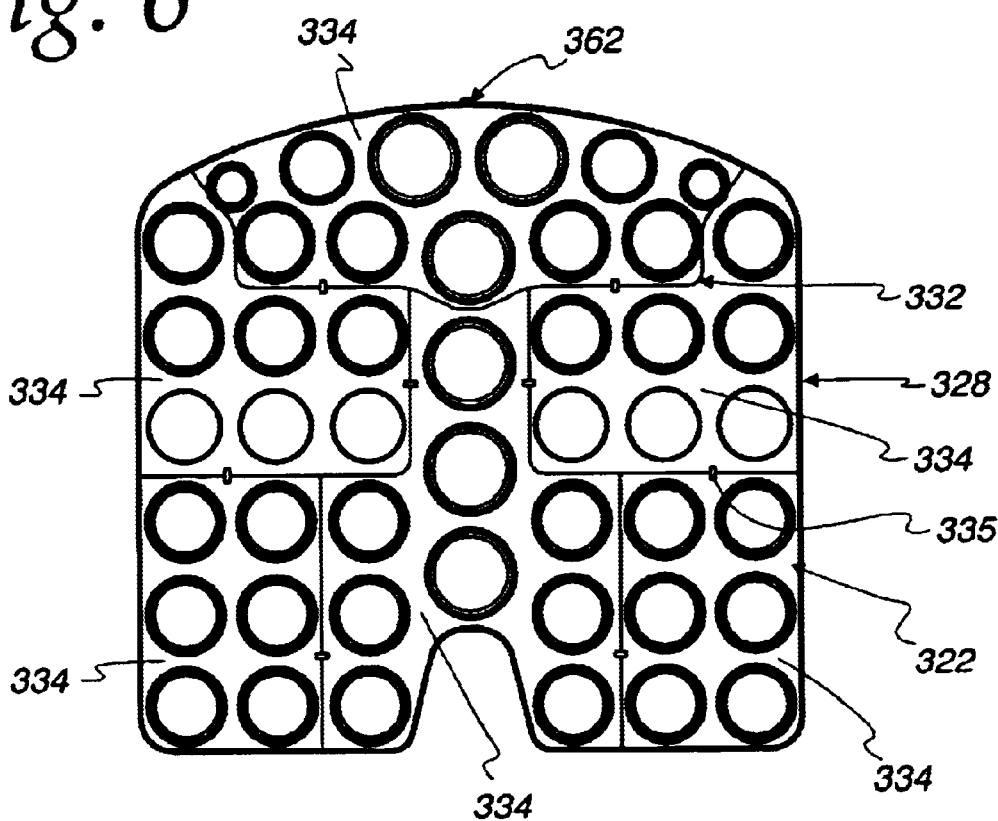
FIG. 6 is a top plan view of an energy dissipation means suitable for use with a body support system of the instant invention.
Figure 7:
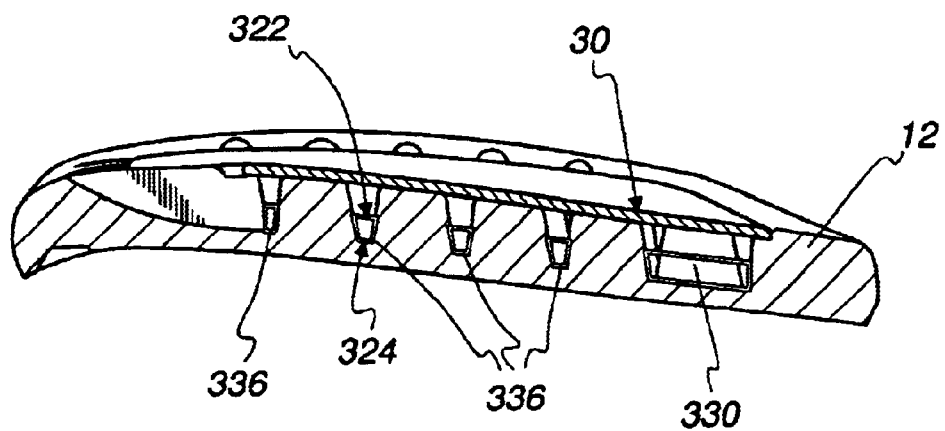
FIG. 7 is a cross sectional view of a body support system of the instant invention including an energy dissipation means.
Figure 8:
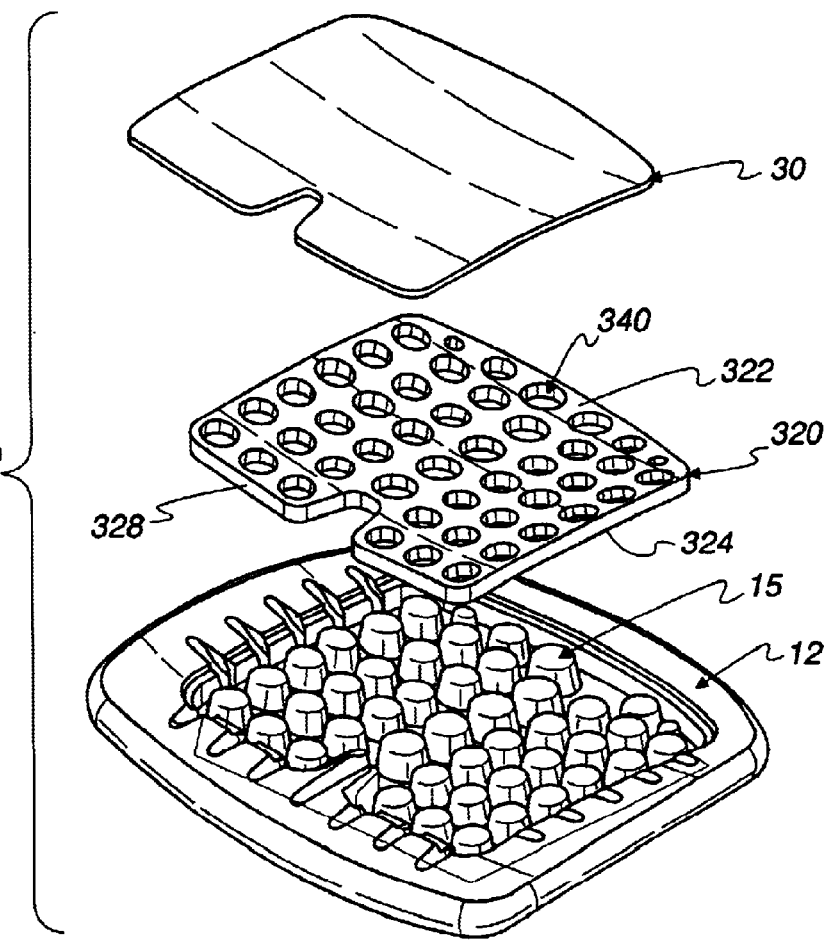
FIG. 8 is an exploded view of some of the components of FIG. 7.

FIGS. 6, 7, and 8 illustrate yet another embodiment of the instant invention wherein the body support system of the instant invention further comprises energy modulation means 320 for converting the vertical component of the applied energy of a user's weight to nonvertical, such as horizontal dissipative components, which would effectively decrease the real vertical reaction experienced by a user, therefore enhancing comfort. In one embodiment, the energy modulation means 320 can comprise a top layer 322 and a bottom layer 324 each made of a flexible fluid-tight membrane, the top and bottom layers being joined at their respective peripheries to form a bladder or flexible fluid chamber 328 having an interior volume 330, and one or more walls 332 in said interior volume 330, said walls extending between the inner surfaces of said top and bottom layers 322, 324 to define a plurality of interconnected chambers 334 within said interior volume 330, said chambers being interconnected via connection means 335 such as baffles, spaces or minute orifices between or in said walls.

Said interior volume 330 contains a viscous fluid 336 that can flow in and among the various interconnected chambers 334 via said connection means 335. When a force such as the weight of a user is applied to the top of the energy modulation means 320, at least some of the viscous fluid 336 in chambers 334 directly beneath the force is further pressurized and squeezed out from chambers experiencing higher pressurization due to vertical load application to other chambers experiencing less of such force. The horizontal movement of the viscous fluid 336 between the interconnected chambers 334 dissipates the energy applied by the user so that the user experiences less real reaction and greater comfort.

Figure 9:
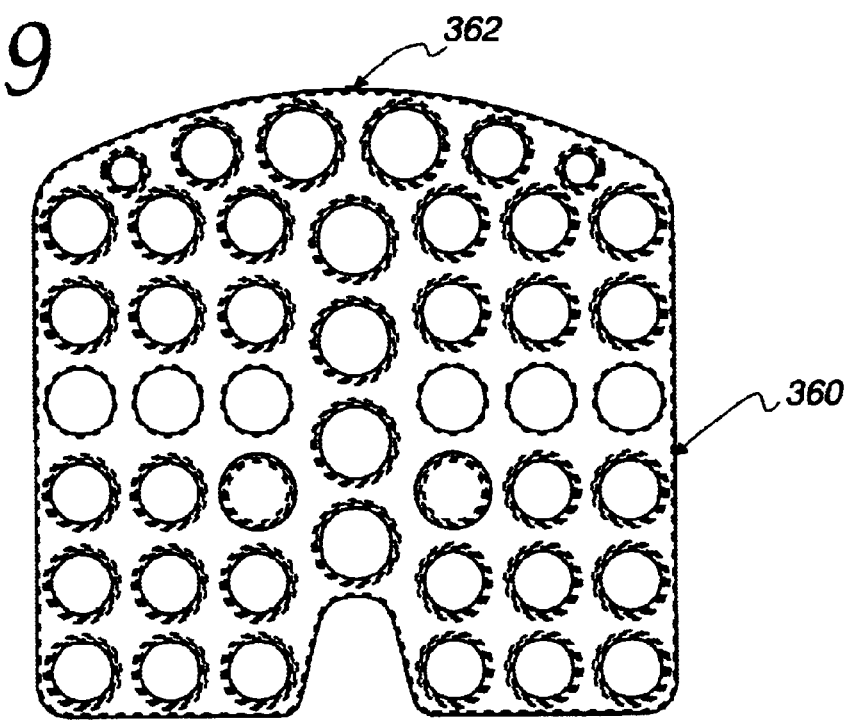
FIG. 9 is a top plan view of an alternative embodiment of an energy dissipation means suitable for use with the instant invention.

In an alternate embodiment illustrated in FIG. 9, a bladder 360 has no internal walls 332 but instead is in the form of one flexible fluid compartment, filled with viscous fluid that may optionally be pressurized. Bladder 360 can be provided with a valve 362 for either filling or emptying the fluid from the bladder.

Figure 10:
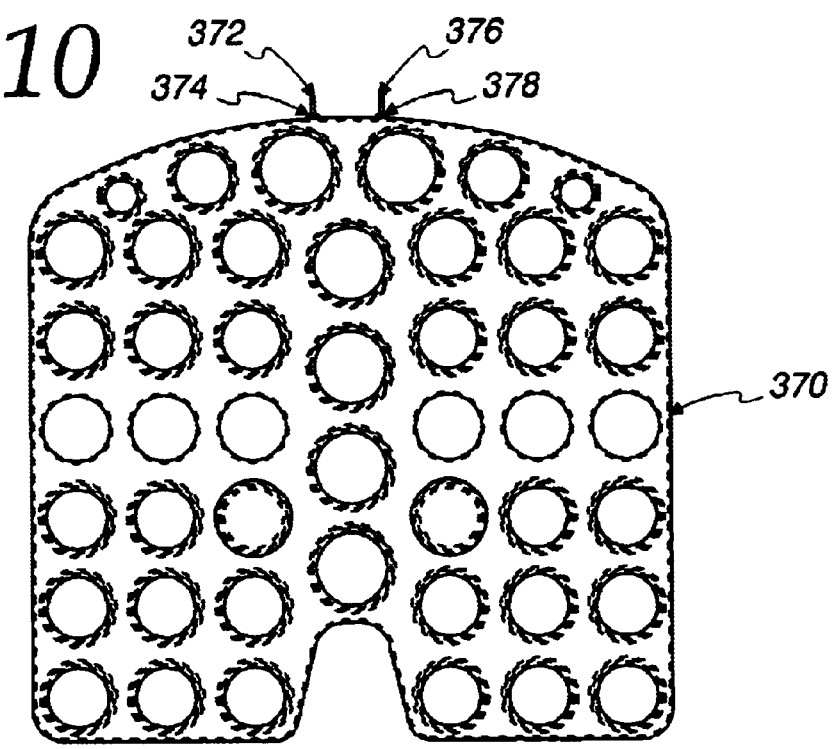
FIG. 10 is a top plan view of yet another alternative embodiment of an energy dissipation means suitable for use with the instant invention.

In another embodiment illustrated in FIG. 10, compartment 370 may be depressurized and evacuated from fluid, so that it can fill with air or other fluid added into it from an outside source by means of an inlet flexible tube 372 equipped with a one-way valve 374, therefore, providing means to store such externally added fluid, and means to later dispose of it, by means of an outlet flexible tube 376, equipped with a one-way valve 378, by either using differential static pressure or by using of micro-pumps attached to such pressurized or un-pressurized fluid containment system.

When used in conjunction with a body support system such as the seat cushion illustrated in FIG. 1, energy dissipation means 320 can be most preferably be positioned in between vertical columns 15 and beneath elastomeric layer 30, or above elastomeric layer 30 and beneath optional intermediate foam layer 37, or directly beneath air permeable layer 35. Alternatively, energy dissipation means 320 can be configured to have a plurality of orifices 340 extending therethrough, said orifices 340 being positioned and dimensioned to receive vertical columns 15 such that energy dissipation means 320 surrounds at least part of the vertical length of columns 15 and at least takes up part of the space of air reservoir 18.

Figure 11:
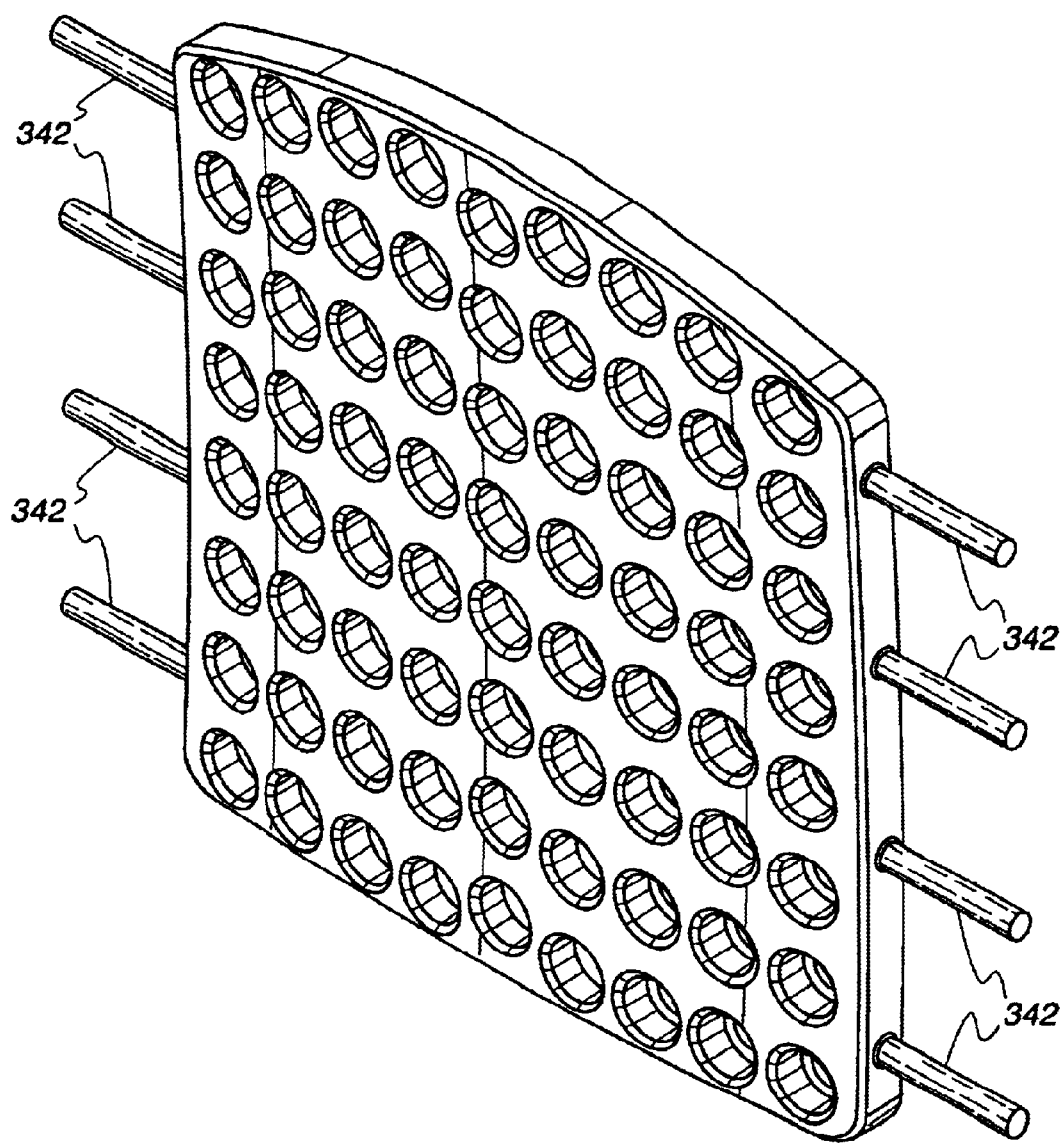
FIG. 11 is a perspective view of still another embodiment of an energy dissipation means suitable for use with the instant invention.

The viscous fluid 336 can be contained completely within the energy dissipation means. Alternatively, viscous fluid can flow between interior volume 330 and an external fluid reservoir via one or more tubes 342, generally indicated in FIG. 11.

Energy dissipation means 320 can be made of any suitable material such as plastic sheets or air-impermeable flexible membranes, which are flexible, and both inert and impermeable to the viscous fluid used. The material should also retain its strength and flexibility over the temperature and pressure conditions in which the body support system will be used. Gelatinous, Polyethylene, or Polyvinyl chloride are suitable materials for most applications. The viscous fluid can be any inert fluid that maintains viscosity in an acceptable range in the temperature and pressure conditions in which the body support member will be used. The viscous fluid should have a scale Shore A hardness of about 1–15, preferably about 3–10, and most preferably about 4–8. Mineral oil is one suitable viscous fluid for many application of the instant invention.

The energy dissipation means presents many parameters that can be varied to meet the needs of a particular user or a particular type of use. These parameters include, for example, the materials used in the top and bottom layers and interior walls, the dimensions of the layers and walls, the dimensions of the spaces or orifices interconnecting said chambers, and the volume and viscosity of the viscous fluid. The energy dissipation means 320 can be provided with orifices, baffles, and/or valves disposed between the various chambers 334 or between the interior volume 330 and the tubes 342, or between the tubes 342 and the fluid reservoir. In one embodiment, the opening size of these orifices or valves may be externally controlled by the user to provide the level of energy dissipation desired.

The many parameters of energy dissipation means 320 allow it to be adapted to a variety of static and dynamic uses. Energy dissipation means 320 can be used on dynamic seating situations such as farm implements and snowplow trucks to dampen or eliminate vibration frequencies that can be harmful to a user. Energy dissipation means 320 also can be made quite thin while still providing effective protection for a user. This makes the energy dissipation means particularly well suited to applications such as wheelchairs and gurneys. Still other applications include floor mats for persons who stand for long periods of time, athletic pads, and floor and wall cushions for athletic venues and the like.

In each of the embodiments of the instant invention described above, the fluid flow resulting from the structural design and choices of materials for each of the component parts results in two important effects. First, the fluid flow contributes to the thermal regulation function at the user/seat cushion interface substantially through enhanced convection. Second, the fluid flow provides important mechanical effects, in that the fluid flow pumping generates a delay in the cushion responses of deformation and recovery due to loading and unloading of the user's weight. The modular construction of the seat cushion allows the seating designer to choose materials and designs for each of the component parts that will provide both the thermal properties and the mechanical properties desired for a particular application. Thus the seat cushion of the instant invention is adaptable to a wide variety of uses. For example, the seat cushion can be designed for static uses, such as office seating, or for rehabilitative seating such as wheelchairs, or for dynamic uses in which damping of vibrations is an important feature, such as trucks, public transportation seating, farm implements, construction trucks, forklifts, and snowplows.

In yet another embodiment, the fluid in reservoir 18 and channels 20 need not be air, but can be some other fluid such as electrically induced polymer gels, or electro-rheological fluids that change between solid and liquid phase and/or change colors in response to a stress-generated electric field in the fluid or due to heat effects. Electric fields in the fluid also can be generated by piezo electric elements at the vertical columns.

There have been disclosed several embodiments of a body support system having improved mechanical response characteristics and improved thermal regulation. Those skilled in the art will recognize that other embodiments can be made using obvious variations of the disclosed embodiments, and such variations are intended to be within the scope of the claims appended hereto.

We claim:

1. A body support system comprising
   a) a compressible, resilient foam body comprising a fluid reservoir means for directing the flow of fluid from said fluid reservoir toward the periphery of the body support system when a region of said body support system is compressed by a user,
   b) elastomeric means for distributing a load applied to said body support system by a user, and,
   c) an energy dissipation means, said energy dissipation means comprising a flexible fluid compartment, said flexible fluid compartment containing a volume of a viscous fluid, such that at least a portion of said fluid moves within said flexible fluid compartment in response to a vertical force on said flexible fluid compartment wherein said foam body comprises a plurality of vertical columns, and said flexible fluid compartment is configured to have a plurality of orifices extending therethrough, said orifices being positioned and dimensioned to receive said vertical columns and surround at least a portion of the vertical length thereof.

2. The body support system of claim 1 wherein said flexible fluid compartment comprises a plurality of interconnected chambers, such that said viscous fluid moves from one to another of said chambers in response to a vertical force on said flexible fluid compartment.

3. The body support system of claim 1 wherein said flexible fluid compartment is disposed above said resilient foam body.

4. The body support system of claim 1 further comprising a reservoir in fluid communication with said flexible fluid compartment.

5. The body support system of claim 1 further comprising valves adapted to control the flow of fluid within said flexible fluid compartment.

6. The body support system of claim 1 wherein said viscous fluid has a scale Shore A hardness in the range of about 1–15.

7. The body support system of claim 1 wherein said viscous fluid is mineral oil.

8. A body support system comprising:
   a compressible, resilient foam layer having a central region;
   a plurality of spaced apart structural elements defining a fluid reservoir in said central region;
   a plurality of fluid channels in said foam layer in communication with said fluid reservoir for communicating fluid into and out of said fluid reservoir;
   an elastomeric layer disposed above said central region of said foam layer, above said structural elements and above said fluid reservoir, said elastomeric layer having resilience and flow properties; and
   an energy dissipation means, said energy dissipation means comprising a flexible fluid compartment, said flexible fluid compartment containing a volume of a viscous fluid, such that at least a portion of said fluid moves within said flexible fluid compartment in response to a vertical force on said flexible fluid compartment.

9. The body support system of claim 8 wherein said foam layer comprises an upper surface; and said plurality of fluid channels is formed in said upper surface and extends from said fluid reservoir.

10. The body support system of claim 8 wherein said plurality of spaced apart structural elements comprises a plurality of vertical columns, and wherein said elastomeric layer distributes load applied to said body support member by a user and is disposed above said columns and in cooperative engagement therewith.

11. The body support system of claim 10 wherein said elastomeric layer comprises a viscoelastic gel.

12. The body support system of claim 10 further comprising means for directing the flow of fluid from said reservoir toward a central area of said body support system disposed above said elastomeric layer.

13. The body support system of claim 12 wherein said means for directing the flow of fluid comprises an air-permeable layer disposed above said elastomeric layer; and said fluid is air.

14. The body support system of claim 12 further comprising an intermediate foam layer disposed between said air-permeable layer and said elastomeric layer.

15. The body support system of claim 8 further comprising a cover fabric.

16. The body support system of claim 8 being in the form of a seat cushion.

17. The body support system of claim 16 wherein said seat cushion is adapted for use in a moving vehicle.

18. The body support system of claim 15 wherein said fabric comprises a phase change material.

19. The body support system as claimed in claim 8 wherein said fluid is air; and including an air-permeable layer disposed above said elastomeric layer for diffusing air to and away from a body on said system.

20. A body support system comprising:
a) a foam body;
b) a plurality of resilient vertical members having air spaces therebetween, said resilient vertical members each being independently deformable;
c) an elastomeric member disposed over said resilient vertical members and in contact therewith,
d) an air-permeable layer disposed over said elastomeric member,
e) a cover providing an interface between said body support member and a user; and
f) an energy dissipation means, said energy dissipation means comprising a flexible fluid compartment, said flexible fluid compartment containing a volume of a viscous fluid, such that at least a portion of said fluid moves within said flexible fluid compartment in response to a vertical force on said flexible fluid compartment;
said foam body, plurality of vertical members, elastomeric member, air-permeable and cover being in cooperative assembly such that when a user exerts a force on said body support member, the force causes air to flow from said air spaces between said resilient vertical members to a region above said elastomeric layer and through said air-permeable layer to said interface with the user.

21. The body support system of claim 20 wherein said vertical members extend upwardly from said foam body.

22. The body support system of claim 20 wherein said vertical members extend downwardly from said elastomeric member.

23. The body support system of claim 20 wherein said foam body has a plurality of channels formed therein, said channels facilitating the flow of air from said air spaces to said interface.

24. The body support system of claim 20 wherein said elastomeric layer comprises a gelatinous material and a polymeric membrane.

25. The body support system of claim 20 further comprising a cover fabric.

26. The body support system of claim 25 wherein said fabric comprises a phase change material.

27. A body support system comprising:
a first layer having resilience and flow properties for damping and distributing applied forces from the weight of a user's body and to reduce shear on said body; and
a second layer located beneath said first layer and in operative communication therewith, said second layer having a region with a boundary, a plurality of structures deformable and responsive to compressive forces spaced about in said region, said region also forming a fluid reservoir, and a plurality of fluid passages communicating said fluid reservoir beyond said boundary and beyond said first layer for thermal effects;
an energy dissipation means, said energy dissipation means comprising a flexible fluid compartment, said flexible fluid compartment containing a volume of a viscous fluid, such that at least a portion of said fluid moves within said flexible fluid compartment in response to a vertical force on said flexible fluid compartment; and
wherein structures of said plurality of structures are each generally independent of one another and are responsive to localized forces when applied forces on said first layer are absent, and when applied forces are present on said first layer, said first layer distributes said applied forces such that structures under said applied forces as well as neighboring structures are exposed to compressive forces.

28. The body support system claimed in claim 27 wherein fluid from said fluid reservoir removes heat from said first layer, which heat is generated by the user's body.

29. The body support system as claimed in claim 28 including an air-permeable layer disposed above said first layer for diffusing air to and from said user's body; and wherein said fluid is air.

* * * * *